(12) United States Patent
Narazaki

(10) Patent No.: US 6,462,503 B1
(45) Date of Patent: Oct. 8, 2002

(54) DRIVE CONTROL SYSTEM FOR STEPPING MOTOR

(75) Inventor: Sadatoshi Narazaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/703,808

(22) Filed: Nov. 2, 2000

(30) Foreign Application Priority Data

Nov. 8, 1999 (JP) ............................................. 11-316205

(51) Int. Cl.[7] ................................................ H02P 8/00
(52) U.S. Cl. ...................................... 318/696; 318/685
(58) Field of Search ................................ 318/685, 696

(56) References Cited

U.S. PATENT DOCUMENTS

| | | | | | |
|---|---|---|---|---|---|
| 4,586,808 A | * | 5/1986 | Tanimoto et al. | ............... | 355/8 |
| 4,833,372 A | * | 5/1989 | Kobayashi et al. | ......... | 318/696 |
| 4,869,610 A | * | 9/1989 | Nishizawa et al. | ......... | 400/322 |
| 5,008,607 A | * | 4/1991 | Ono et al. | ................... | 318/696 |
| 5,446,358 A | * | 8/1995 | Nakata | ........................ | 318/696 |
| 5,670,855 A | * | 9/1997 | Okunishi | ..................... | 318/696 |
| 5,841,261 A | * | 11/1998 | Nojima et al. | ............... | 318/696 |
| 5,959,426 A | * | 9/1999 | Moeller et al. | .............. | 318/685 |
| 5,963,005 A | * | 10/1999 | Yamaji | ........................ | 318/685 |
| 5,963,006 A | * | 10/1999 | Otani | .......................... | 318/696 |
| 6,140,792 A | * | 10/2000 | Kameyama et al. | ........ | 318/685 |
| 6,184,646 B1 | * | 2/2001 | Yagoshi et al. | ............. | 318/696 |

* cited by examiner

Primary Examiner—Marlon T. Fletcher
Assistant Examiner—Rina I. Duda
(74) Attorney, Agent, or Firm—Fitzpatrick, Cella, Harper & Scinto

(57) ABSTRACT

A device is provided for chopping a control signal of an initial excitation phase or a final excitation phase by a predetermined cycle during low speed rotation control of an excitation phase control signal (excitation control signal) of a stepping motor when acceleration control and deceleration control of the stepping motor are effected, thereby reducing an excessively great driving current created during low speed rotation of the stepping motor, particularly the initial retaining excitation period during acceleration control and the final retaining excitation period during deceleration.

14 Claims, 12 Drawing Sheets

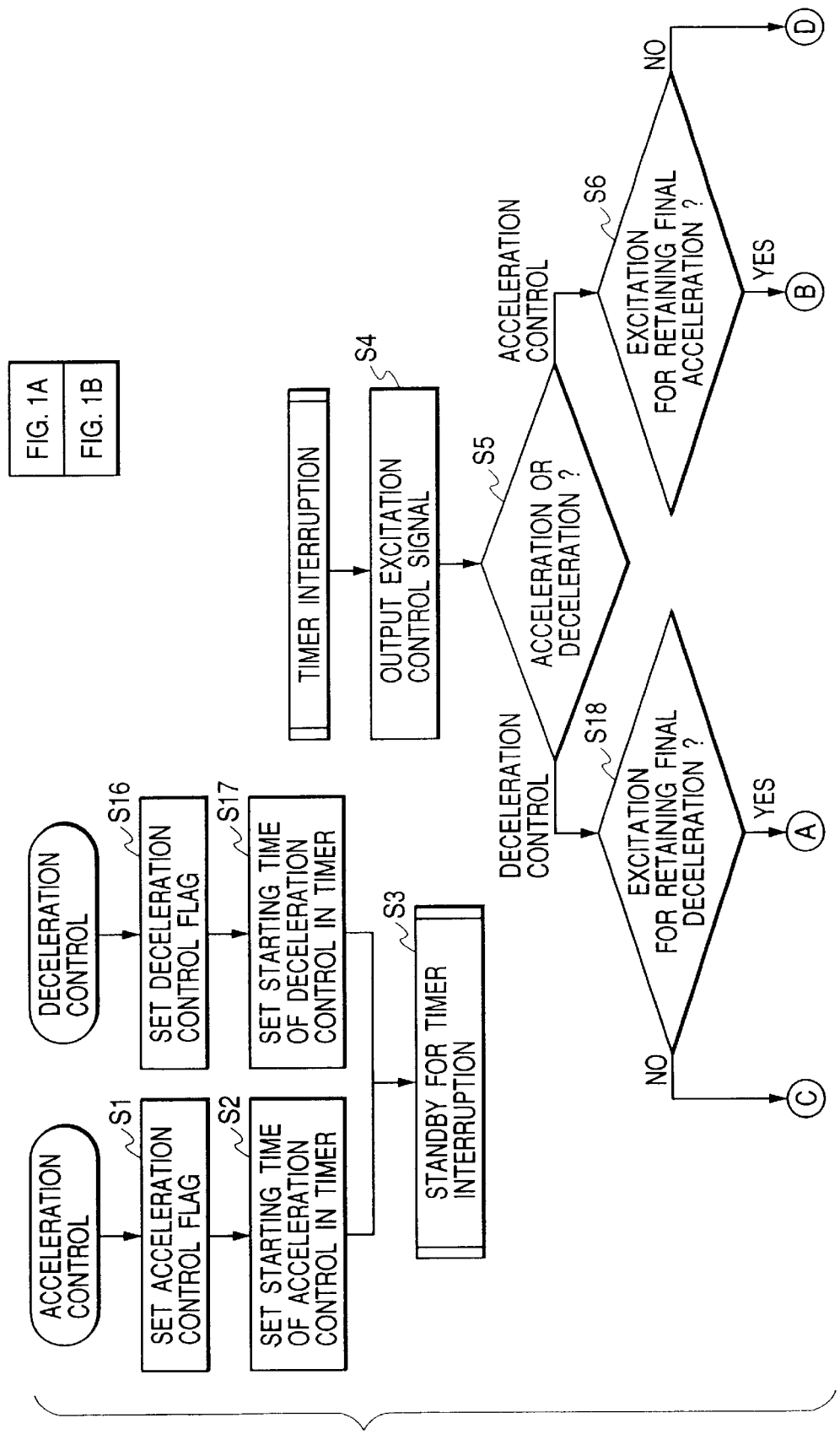

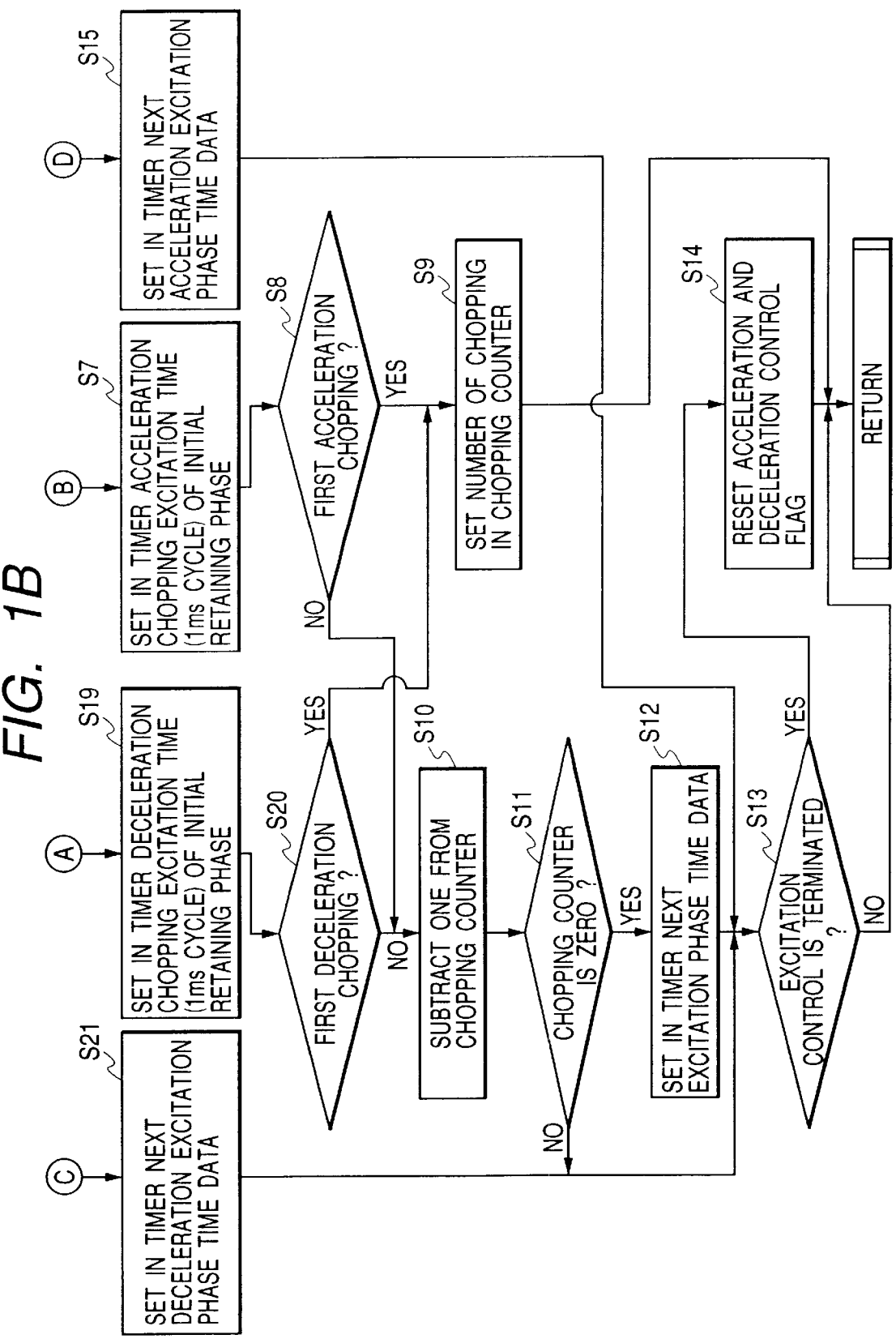

DRIVE CONTROL SYSTEM FOR STEPPING MOTOR

BACKGROUND OF THE INVENTION

1. Field of the Invention

This invention relates to a motor drive control system for rotating a motor such as a stepping motor with an excitation phase thereof change over, and particularly to a drive control system for stably controlling a plurality of stepping motors for effecting acceleration control, deceleration control, retaining control, etc. with a low driving electric power when the stepping motors are driven at one time.

2. Related Background Art

As a typical heretofore known drive system for a stepping motor, there is a constant voltage drive system. The constant voltage drive system is simple in circuit construction and inexpensive and therefore has been widely adopted.

FIGS. 16 and 17 of the accompanying drawings show the timing of excitation control signals for a 1–2 phase excitation system and a second phase excitation system heretofore generally adopted as the drive system for a stepping motor. Also, FIG. 18 of the accompanying drawings shows the relation of the velocity control of a stepping motor, and shows areas for performing the accelerating operation of changing the frequencies of the excitation control signals shown in FIGS. 16 and 17 to thereby change the number of revolutions of the stepping motor and provide a predetermined rotating velocity within a predetermined time, the constant velocity operation providing a constant rotating velocity, and the decelerating operation stopping rotation within a predetermined time. These series of accelerating, constant velocity and decelerating operations together constitute the operation sequence of the stepping motor.

Here, FIG. 14 of the accompanying drawings and Table 1 show an example of the timing of 1–2 phase excitation and the excitation time during acceleration, and FIG. 15 of the accompanying drawings and Table 2 likewise show an example of the timing and the excitation time during deceleration. As shown in Table 1 and Table 2, generally during the non-driving (t0 in Table 1, and t10 in Table 2) of the stepping motor, control is effected so as to decrease electric power consumption in such a manner as to cut off the excitation phase of the stepping motor and not to supply an electric current to the stepping motor.

Table 1 below shows the excitation time during the acceleration in the drive control of a stepping motor according to the prior art, and Table 2 below shows the excitation time during the deceleration in the drive control of the stepping motor according to the prior art.

TABLE 1

| Excitation period | Excitation time |
|---|---|
| t0 | excitation off |
| t1 | initial excitation retaining |
| t2 | 1.67 ms |
| t3 | 1.60 ms |
| t4 | 1.53 ms |
| t5 | 1.48 ms |
| t6 | 1.43 ms |
| t7 | 1.38 ms |
| t8 | 1.34 ms |
| t9 | 1.30 ms |
| t10 | 1.27 ms |

TABLE 2

| Excitation period | Excitation time |
|---|---|
| t0 | 1.27 ms |
| t1 | 1.30 ms |
| t2 | 1.34 ms |
| t3 | 1.38 ms |
| t4 | 1.43 ms |
| t5 | 1.48 ms |
| t6 | 1.53 ms |
| t7 | 1.60 ms |
| t8 | 1.67 ms |
| t9 | final excitation retaining |
| t10 | excitation off |

In such a state, the deviation or the like between the static stop position of the stepping motor when excitation is off and the dynamic stop position of the stepping motor when excited is a problem and the accuracy of the stop position is aggravated and therefore, when the stepping motor is to be driven again, the state of the second excitation of the rotation initial phase and rotation final phase of 1–2 phase excitation control is once continued for a predetermined time as indicated by t1 and t9 in FIGS. 14 and 15 in order to increase the positioning accuracy of the rotation starting position and rotation stopping position of the stepping motor during the initial phase excitation before the start of acceleration and the final excitation immediately before the termination of deceleration.

FIGS. 10, 11, 12 and 13 of the accompanying drawings show an example of the relation between the winding electrical current flowing to a winding of the stepping motor when acceleration control and deceleration control are effected by the aforedescribed prior-art system and the excitation control signal thereof. Here, when an attempt is made to effect stepping motor acceleration control (hereinafter referred to as the high speed rotation) by the aforedescribed constant voltage driving system as shown in FIG. 11, wherein the driving frequency of the excitation control signal is gradually increased, as is apparent from FIGS. 10 and 11, the rising of the electrical current of the windings of the stepping motor becomes slow and the substantial electrical current of the windings becomes small without the current value being saturated, and as the result, the driving torque of the stepping motor decreases in a high speed rotation area.

Likewise, when an attempt is made to effect deceleration control (hereinafter referred to as the low speed rotation) as shown in FIG. 13 wherein the driving frequency of the excitation control signal is gradually decreased, as is apparent from FIGS. 12 and 13, the influence of the inductance of the windings of the stepping motor is not so great as during the high speed rotation, and the current value is saturated in an area wherein the driving frequency is low and a great electrical current of the windings flows and the driving torque also becomes great. Accordingly, when an attempt is made to effect the driving of the stepping motor from low speed rotation to high speed rotation, the driving torque of the stepping motor decreases during the high speed rotation and therefore, to maintain the torque during the high speed rotation, for example, the driving voltage of the stepping motor is increased or the resistance value of the windings is lowered or the number of the windings is decreased to make the inductance small.

Also, at this time, in order to decrease the noise caused by the excessively great torque during low speed rotation, a method of providing a transistor switch in the power source supply line of the stepping motor, and chopping this transistor to thereby reduce the electrical current of the entire stepping motor is utilized. The transistor switch provided in the power source line needs to have a low voltage drop in the transistor from a property thereof, and such a transistor is expensive and has suffered from the problem of a high cost.

Also, even if these methods are carried out, ideal uniform driving torque from low speed rotation to high speed rotation and the driving current thereof are not obtained and as the result, a decrease in the torque during the high speed rotation is unavoidable and therefore, in reality, stepping motor control from the low speed to the high speed is effected on the basis of this torque. Accordingly, generally the specification of the stepping motor is determined on the basis of the torque for the actual driving current during the high speed rotation and therefore, unexpected excessively great torque and an excessively great electrical current of the windings are created in the initial excitation phase during low speed rotation, particularly at the start of acceleration, and at the final excitation phase or the like at the terminal of deceleration.

Further, when in such a state, an attempt is made to drive two or more stepping motors at a time, there has been the problem that a very great electrical current of the windings of the stepping motors flows and a great current capacity power source becomes necessary. Also, when the capacity of the power source is small, there has been the problem that when the stepping motor is driven, an overcurrent protection circuit is operated and the power source is cut off and in some cases, the power source does not normally operate.

SUMMARY OF THE INVENTION

It is an object of the present invention to solve the above-noted problems and to provide a stepping motor drive control system designed to reduce an excessively great driving current to thereby effect the stable rotative driving of the motor.

It is another object of the present invention to provide a stepping motor drive control system for reducing the excessively great driving current created in the initial retaining excitation period during low speed rotation, particularly the acceleration control, of a stepping motor and the final retaining excitation period or the like during the deceleration of the stepping motor to thereby enable a power source of small power capacity to be used as a power source for driving the stepping motor.

Further objects of the present invention will become apparent from the following description of some specific embodiments of the invention.

BRIEF DESCRIPTION OF THE DRAWINGS

FIG. 1 is comprised of FIGS. 1A and 1B showing a flow chart of acceleration control and deceleration control according to Embodiment 1 of the present invention.

DESCRIPTION OF THE PREFERRED EMBODIMENTS

Some embodiments of the present invention will hereinafter be described with reference to the drawings.

[Embodiment 1]

The present invention will hereinafter be described with reference to the accompanying drawings.

As drive control systems for a stepping motor, there are various systems such as first phase excitation, second phase excitation and 1–2 phase excitation, and herein the 1–2 phase excitation system will be described as an example.

Figure 2:
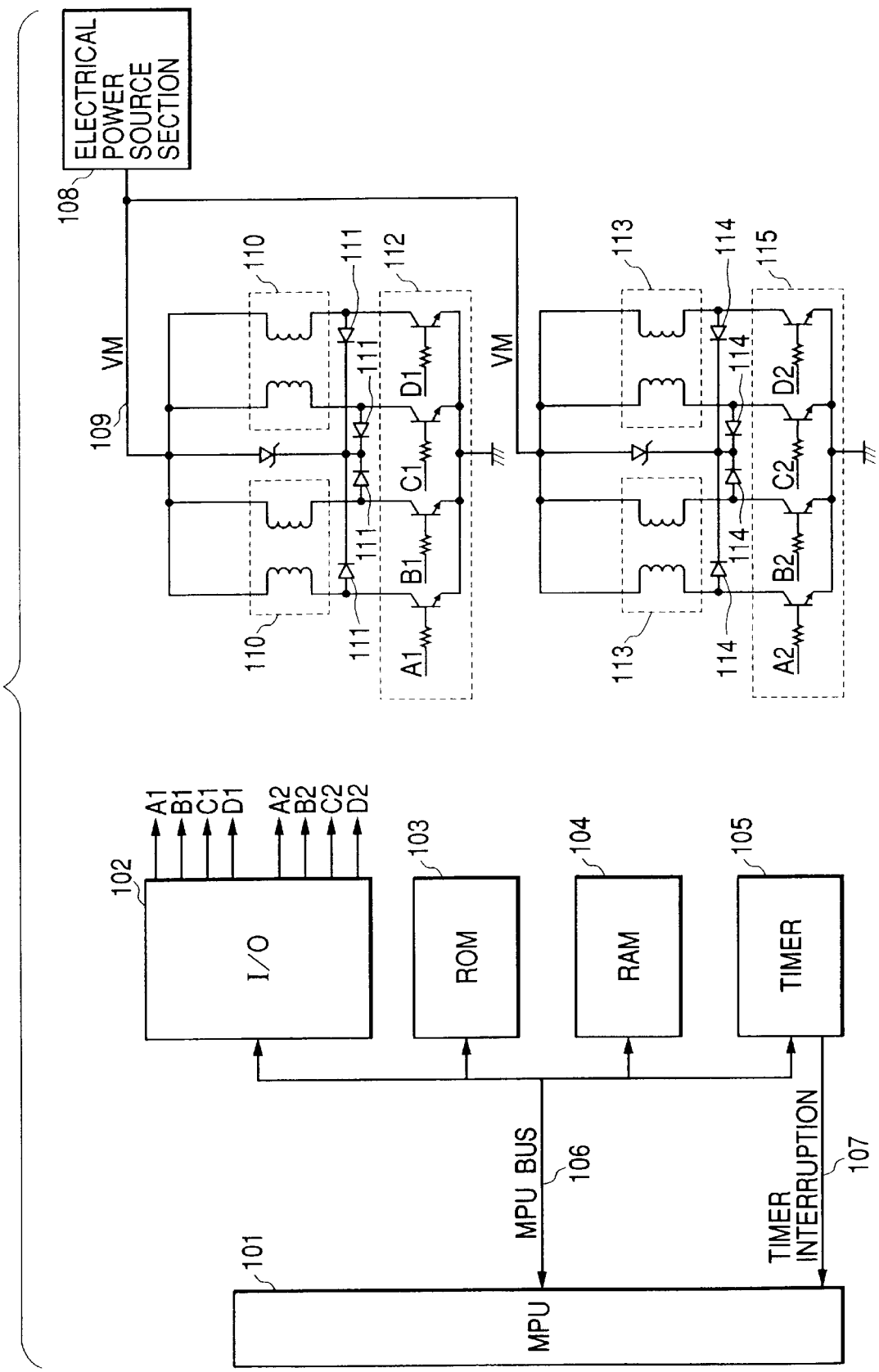
FIG. 2 is a block diagram of a stepping motor drive control circuit according to Embodiment 1 of the present invention.

FIG. 1 is comprised of FIGS. 1A and 1B showing a flow chart of an acceleration control and deceleration control system during the driving of a stepping motor according to the present embodiment. FIG. 2 is a block diagram schematically showing the construction of a stepping motor driving circuit in the present embodiment.

In FIG. 2, the reference numeral 101 designates an MPU, such as a microprocessor, for effecting the rotation drive control of the stepping motor, and as a work area, it is bus-connected to a RAM 104 and a ROM 103 storing therein the control program of the MPU 101 and excitation control signal data such as acceleration control, deceleration control and constant velocity control.

The reference numeral 102 denotes an output port connected to an MPU bus 106, and it puts out excitation phase control signals (A1, D1, A2 and D2) outputted from the MPU 101. The reference numeral 105 designates a timer capable of programming, and it starts time counting by the instructions of the MPU 101, and when the instructed time elapses, it can inform the MPU 101 of it, for example, by timer interruption 107. By the timer interruption 107, the MPU 101 reads out the excitation control signal data stored in the ROM 103 from an MPU bus 106, and outputs excitation control signals (A1 D1, A2 D2) to the output port 102 and also sets data for the next time counting in the timer 105 via the MPU bus 106.

The reference numerals 110 and 113 denote unipolar-connected stepping motors of four phases. Here, the stepping motor 110 will be described as a paper feeding motor and the stepping motor 113 will be described as a paper conveying motor. The reference numeral 112 and 115 designate transistor arrays, and corresponding transistors are ON/OFF-controlled by excitation phase control signals (A1 D1, A2 D2) outputted from the output port 102 to thereby effect the excitation of each phase of the stepping motors 110 and 113.

The reference numerals 111 and 114 denote flywheel diodes for forming current paths for permitting the generation of electric currents by counter electromotive forces created in the windings of the stepping motors 110 and 113 when the transistor arrays 112 and 115 are turned OFF. The reference numeral 108 designates a power source supplying a stepping motor driving voltage VM109 to the stepping motors 110 and 113.

Figure 3:
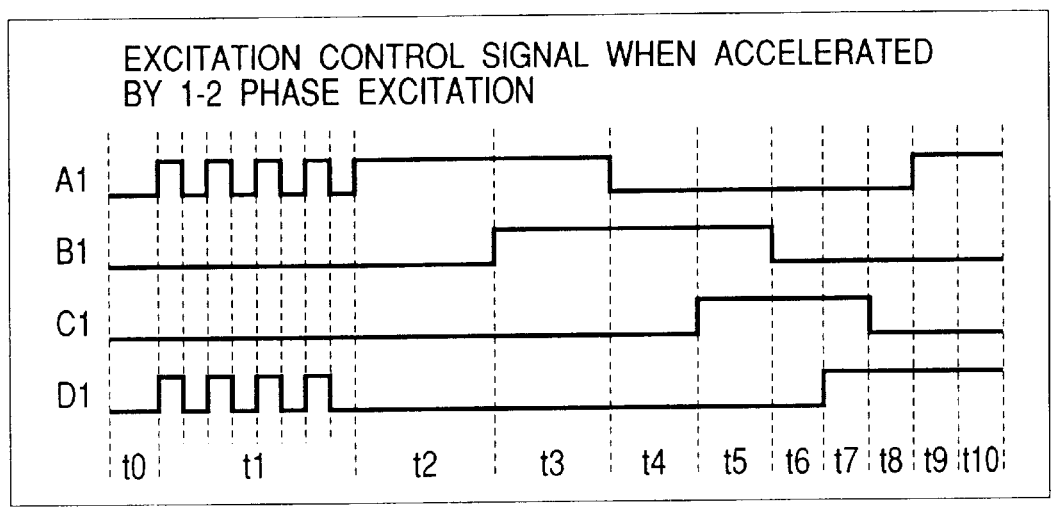
FIG. 3 shows an excitation control signal during the 1–2 phase excitation acceleration of the stepping motor shown in FIG. 2.
Figure 4:
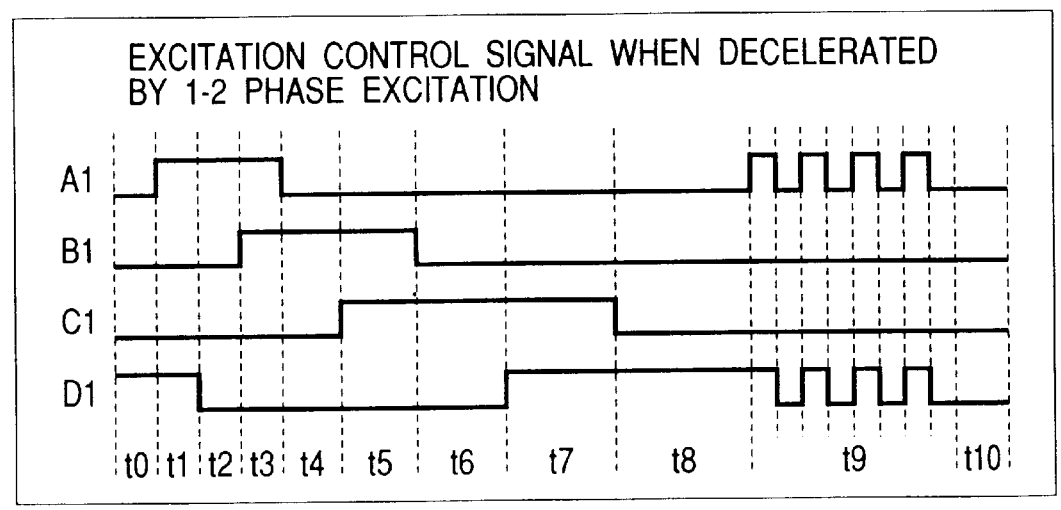
FIG. 4 shows an excitation control signal during the 1–2 phase excitation deceleration of the stepping motor shown in FIG. 2.

FIG. 3 and Table 3 show an example of the timing and excitation time of Embodiment 1 when the unipolar stepping motors 110 and 113 are acceleration rotatively driven by 1–2 phase excitation, and FIG. 4 and Table 4 likewise show an example of the timing and excitation time of Embodiment 1 when the unipolar stepping motors 110 and 113 are deceleration-rotatively driven.

The time data of excitation periods t0 and t10 and the chopping period data of excitation periods t1 and t9 shown in Table 3 and Table 4 are stored in advance in the ROM 103, and the timing t0 and t10 at which the excitation control signal (A1 D1) is changed over is effected on the basis of the time counting by the timer 105, and the MPU 101 executes software for control stored in the ROM 103, whereby the software is controlled.

Table 3 is a table showing the excitation time during the acceleration of the stepping motors shown in FIG. 2, and Table 4 is a table showing the excitation time during the deceleration of the stepping motors shown in Table 3.

TABLE 3

| Excitation period | Excitation time |
| --- | --- |
| t0 | excitation off |
| t1 | 1 ms chopping |
| t2 | 1.67 ms |
| t3 | 1.60 ms |
| t4 | 1.53 ms |
| t5 | 1.48 ms |
| t6 | 1.43 ms |
| t7 | 1.38 ms |
| t8 | 1.34 ms |
| t9 | 1.30 ms |
| t10 | 1.27 ms |

TABLE 4

| Excitation period | Excitation time |
| --- | --- |
| t0 | 1.27 ms |
| t1 | 1.30 ms |

TABLE 4-continued

| Excitation period | Excitation time |
| --- | --- |
| t2 | 1.34 ms |
| t3 | 1.38 ms |
| t4 | 1.43 ms |
| t5 | 1.48 ms |
| t6 | 1.53 ms |
| t7 | 1.60 ms |
| t8 | 1.67 ms |
| t9 | 1 ms chopping |
| t10 | excitation off |

In this manner, by the control of the software, the time interval at which the excitation control signal (A1 D1) is changed over is changed so as to gradually become shorter and the acceleration control of the stepping motor 110 is effected. Here, the stepping motor 110 is a paper feeding motor and usually need not be driven except when paper supply is effected, and accordingly in order also to restrain the consumption of the power source, the stepping motor diving voltage 109 to the paper feeding motor 110 is cut off. Therefore, the deviation between the static stop position during the OFF period of the excitation of all phases and the rotation starting stop position of second phase excitation is caused during the excitation time off (+0) when all phase excitation control signals (A1 D1) are cut off and therefore, when an initial excitation phase is once excited for a predetermined time during the initial acceleration indicated by the excitation period (+1) of FIG. 3 and Table 3, a great electrical current of the windings flows in the paper feeding motor 110 at this time.

In order to prevent this excessively great electrical current of the windings, in the present embodiment, a predetermined chopping period is set in the timer 105 under the control of the software, and at a timing at which the timer interruption 107 is outputted to the MPU 101, only the corresponding excitation control signal is chopped at a high frequency, e.g. 1 ms period (excitation on for 0.6 mS and excitation off for 0.4 ms) for the period t1 without the phase relation of the excitation control signal (A1 D1) being changed, so that the effective electrical current of the electrical current of windings may be decreased. Here, the period is a predetermined period of 1 ms, but by having a plurality of chopping periods stored in the ROM 103, the period can be set to a different period so that an electrical current of the windings suitable for the specification of the windings of the stepping motor 110 can be let to flow.

Likewise, the time data of the excitation periods t0 to t10 shown in Table 4 is changed so as to gradually lengthen the time interval at which the excitation control signal (A1 D1) is changed over by software control similar to the afore-described acceleration control, whereby the deceleration control of the stepping motor 110 is effected.

Figure 5:
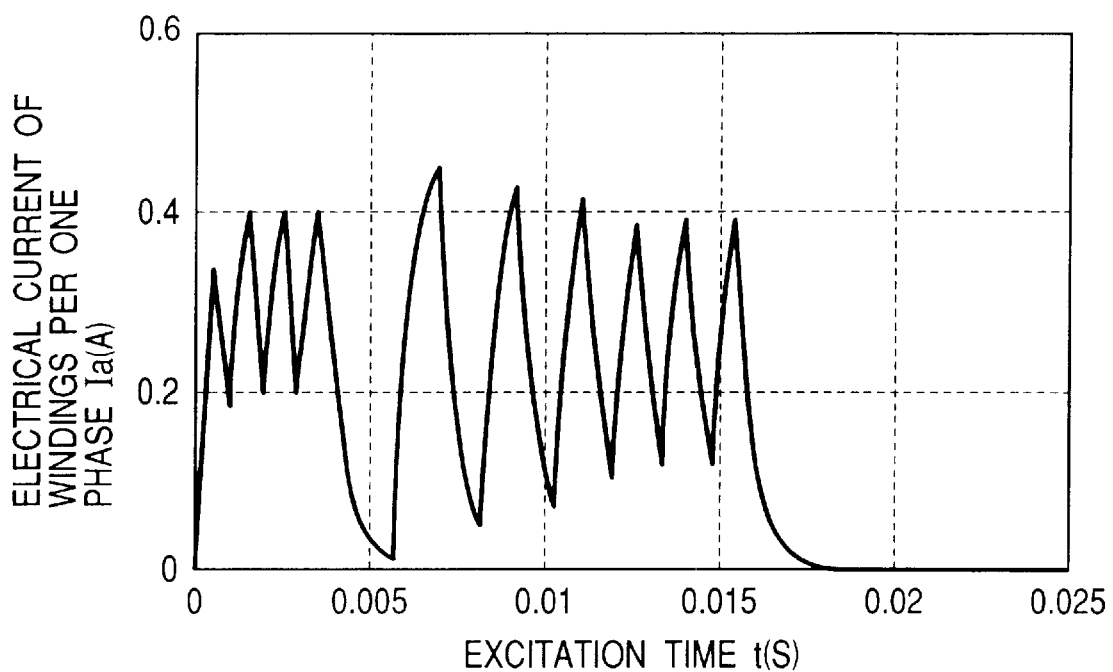
FIG. 5 shows an electrical current of windings per one phase during the acceleration of the stepping motor shown in FIG. 2.
Figure 6:
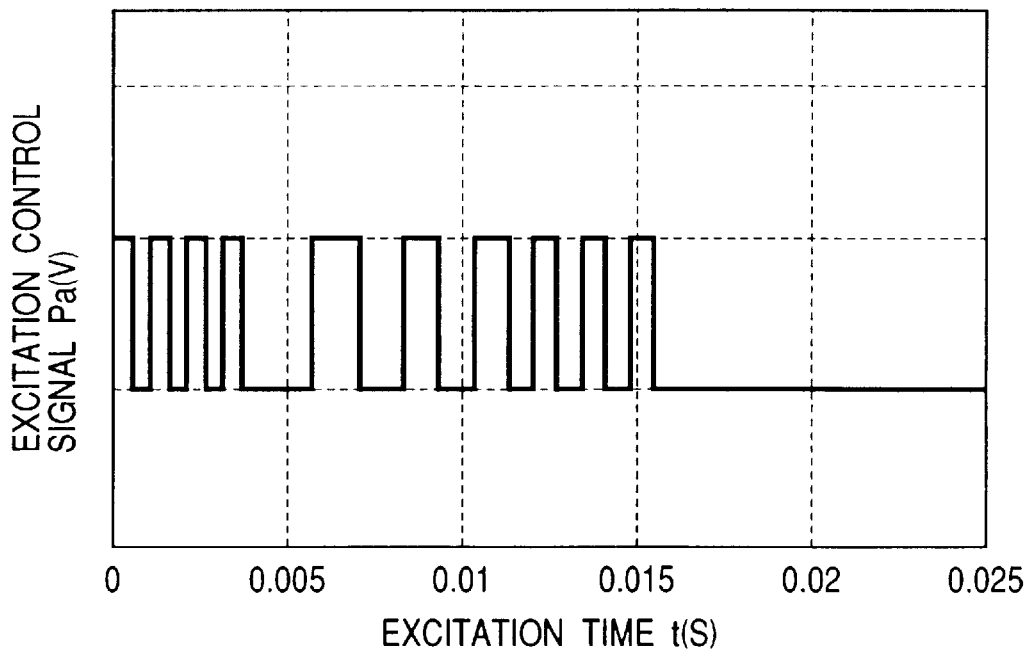
FIG. 6 shows an excitation control signal during the acceleration of the stepping motor shown in FIG. 2.
Figure 7:
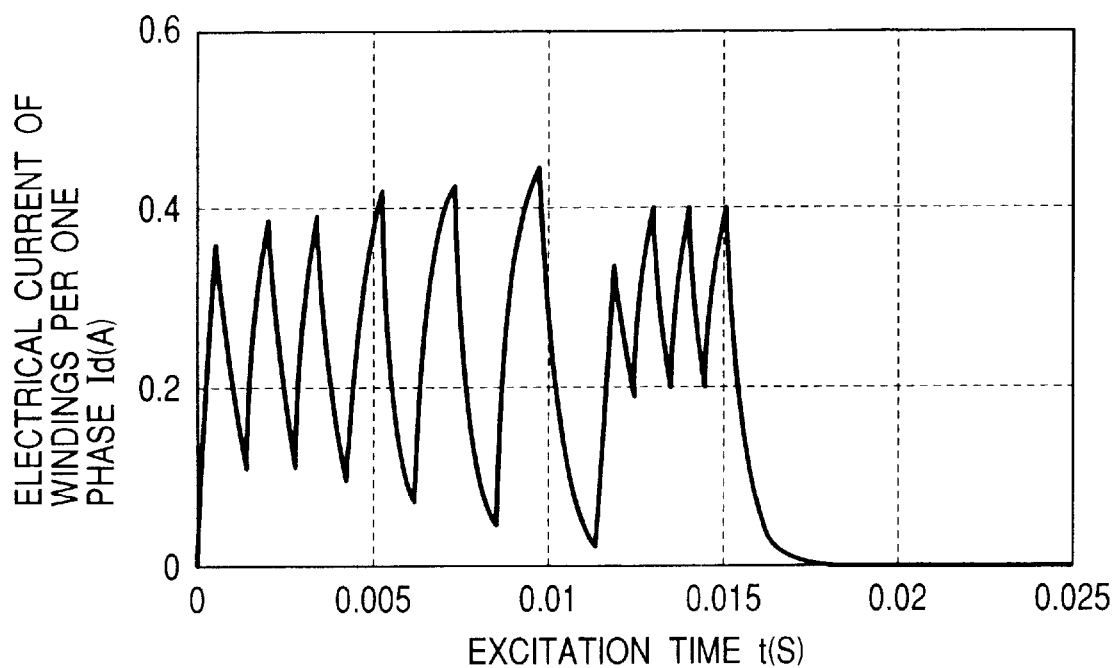
FIG. 7 shows an electrical current of windings per one phase during the deceleration of the stepping motor shown in FIG. 2.
Figure 8:
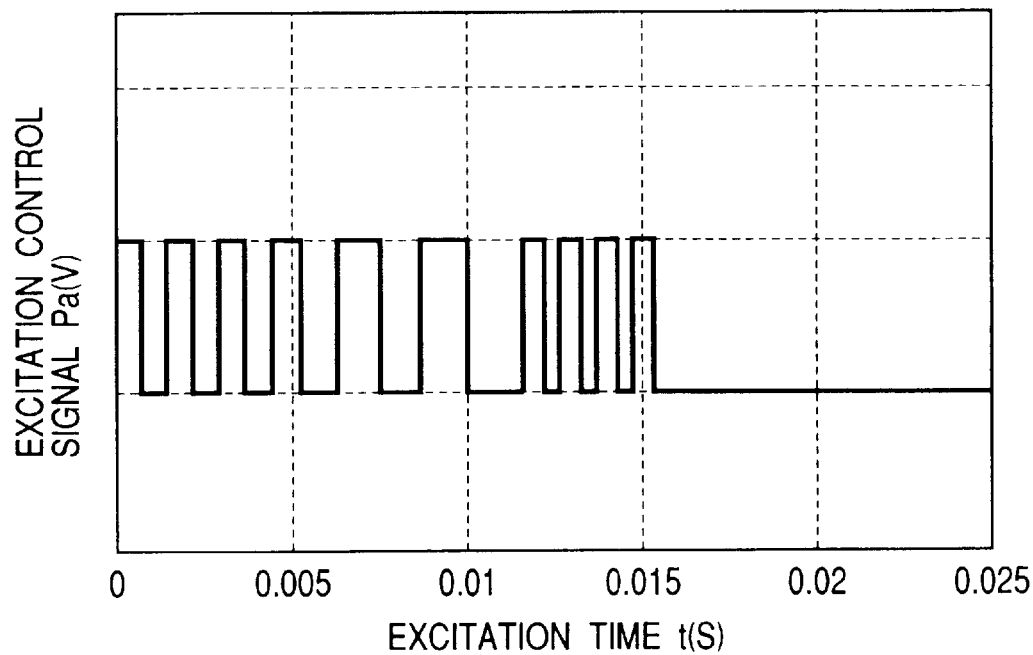
FIG. 8 shows an excitation control signal during the deceleration of the stepping motor shown in FIG. 2.

FIGS. 5 and 6 show one of four excitation phases as an example and a change in the electrical current of the windings flowing through the windings of the stepping motor with respect to acceleration control, and FIGS. 7 and 8 likewise show excitation phases with respect to deceleration control. With regard also to the stepping motor 113, the excitation control signal (A2 D2), not shown, is likewise changed over, whereby control similar to that of the stepping motor 110 can be effected and therefore need not be described.

The acceleration control and deceleration control will now be described in detail with reference to the flow chart of FIGS. 1A and 1B.

In FIGS. 1A and 1B, in the case of the acceleration control, the software stored in the ROM 103 executes the following control. Although not shown, phase control signals for the acceleration control and deceleration control and a phase excitation time table are prepared in advance in the ROM 103.

First at a step S1, in order to discriminate that the control from now on is the acceleration control, the MPU 101 sets an acceleration control flag, e.g. 01 as data, at a predetermined memory location (not shown) in the RAM 104, and at a step S2, it sets the starting time of the acceleration control in the timer 105. When this processing is terminated, the MPU 101 stands by for timer interruption shown at a step S3.

In this state, the time counting of the timer 105 progresses and when the time set at the step S2 is reached, the timer 105 outputs the timer interruption 107 to the MPU 101. When the MPU 101 receives the timer interruption 107, at a step S4, it reads 4 bits of the acceleration phase control signal (A1 D1) of a control signal table, not shown, stored in advance in the ROM 103, through the MPU bus 106, and outputs it to A1 D1 of the output port 102.

Next, at a step S5, in order to judge whether the control is acceleration control or deceleration control, the acceleration control flag of the RAM 104 set at the step S1 is read through the MPU bus 106, and if the read data is 01, it is judged that the control is acceleration control, and a shift is made to the processing of step S6.

At step S6, an initial acceleration flag set at each phase control time in the control signal table, not shown, stored in advance in the ROM 103 at the step S4, for example, a control flag for providing 01 in the case of the excitation for retaining initial acceleration, and providing 00 in the case of ordinary excitation, is read to thereby discriminate whether it is a period for retaining the initial excitation of the acceleration control. When it is discriminated that it is the period for retaining the initial excitation of the acceleration control, advance is made to step S7, where an excitation time of a predetermined acceleration chopping cycle stored in advance in the ROM 103, e.g. 1 ms period (the repletion of excitation on for 0.6 ms and excitation on for 0.4 ms), is set in the timer 105. If the period is not the period for retaining the initial excitation of the acceleration control, advance is made to a step S15, where the next control signal time stored in the ROM 103 is set in the timer 105, and shift is made to a step S13 which will be described later.

At a step S8, the value of the chopping counter preset in the RAM 104 is read through the MPU bus 106, and if the value of the counter is e.g. 00, it is judged that the period is the first period of chopping, and at a step S9, a predetermined number of chopping, here 03 since the frequency is 4 times, is set in the counter, thus terminating the interruption processing. If the value of the counter is not e.g. 00, it means a chopping period, and advance is made to a step S10, where 1 is subtracted from the value of the chopping counter, and a shift is made to a step S11.

At the step S11, where the value of the chopping counter after the aforementioned subtraction is 0 is discriminated, and where the chopping period has ended is judged. If the value of the chopping counter is 0, it means the chopping has ended, and the time data at which the next excitation control signal is outputted is read out from the ROM 103, and is set in the timer 105, and a shift is made to a step S13.

At the step S13, whether the acceleration control has been terminated is discriminated, and if it has been terminated, the acceleration control flag is reset at a step S14 to thereby terminate the acceleration control. If it is a period for the acceleration control, interruption processing is terminated and the next interruption is waited for.

Likewise in the case of deceleration control, first at a step S16, in order to discriminate that the control from now on is deceleration control, the MPU 101 sets a deceleration control flag, e.g. 02 as data, at a predetermined memory location (not shown) in the RAM 104, and at a step S17, the starting time of the deceleration control is set in the timer 105 and at the same time, the number of steps (not shown) of the deceleration control is set in the RAM 104. When this processing ends, the MPU 101 stands by for the timer interruption shown at the step S3.

In this state, the time counting of the timer 105 progresses and when the time set at a step S17 is reached, the timer 105 outputs the timer interruption 107 to the MPU 101. When the MPU 101 receives the timer interruption 107, it reads 4 bits of the deceleration phase control signal (A1 D1) of the control signal table (not shown) stored in advance in the ROM 103 at the step S4, through the MPU bus 106, and outputs it to A1 D1 of the output port 102.

Next, at the step S5, in order to judge whether the control is acceleration control or deceleration control, the deceleration control flag of the RAM 104 set at the step S16 is read through the MPU bus 106, and if the read data is 02, it is judged that the control is deceleration control, and a shift is made to the processing of a step S18.

At the step S18, a final deceleration flag set at each phase control time in the control signal table, not shown, stored in advance in the ROM 103 at the step S4, for example, a control flag for providing 01 in the case of the excitation for retaining the final deceleration, and providing 00 in the case of ordinary excitation, is read, and whether the period is a period for the excitation for retaining the final deceleration of the deceleration control is discriminated.

If here it is discriminated that the period is the period for excitation for retaining the final deceleration, an advance is made to a step S19, where the excitation time of a predetermined deceleration chopping cycle stored in advance in the ROM, e.g. 1 ms cycle (the repletion of excitation on for 0.6 ms and excitation off for 0.4 ms) is set in the timer 105. If the period is not the period for excitation for retaining the final deceleration of the deceleration control, advance is made to a step S21, where the next control signal time stored in the ROM 103 is set in the timer 105, and a shift is made to the step S13.

At a step S20, the value of the chopping counter preset in the RAM 104 is read through the MPU bus 106, and if the value of the counter is e.g. 00, it is judged that the cycle is the first cycle of chopping, and at the stop S9, a predetermined frequency of chopping, here 03 since the frequency is 4 times, is set in the counter, thus terminating the interruption processing. If the value of the counter is not e.g. 00, the period is the chopping period, and advance is made to the step S10, where 1 is subtracted form the value of the chopping counter, and a shift is made so the step S11.

At the step S11, whether the value of the chopping counter after the subtraction is 0 is discriminated, and whether the chopping period has been terminated is judged. If the value of the chopping counter is 0, the chopping has been terminated, and the time data at which the next excitation control signal is outputted is read out from the ROM 103, and is set in the timer 105, and a shift is made to the step S13.

In the foregoing description, the chopping excitation times of the phase for retaining the initial excitation of the acceleration control and the phase for retaining the final excitation of the deceleration control are chopped by the same period, but may be variable periods, and may be stored as a period table in the ROM 103, and this table may be referred to, thereby to determine the excitation time of chopping.

Also, in the foregoing description, the excitation control signal is set in the output port 102 each time the timer interruption occurs, but a PWM (pulse width modulation) function may be added, or an MPU containing the PWM function therein may be used to effect similar control by PWM so as to mitigate the load of the MPU 101.

Figure 10:
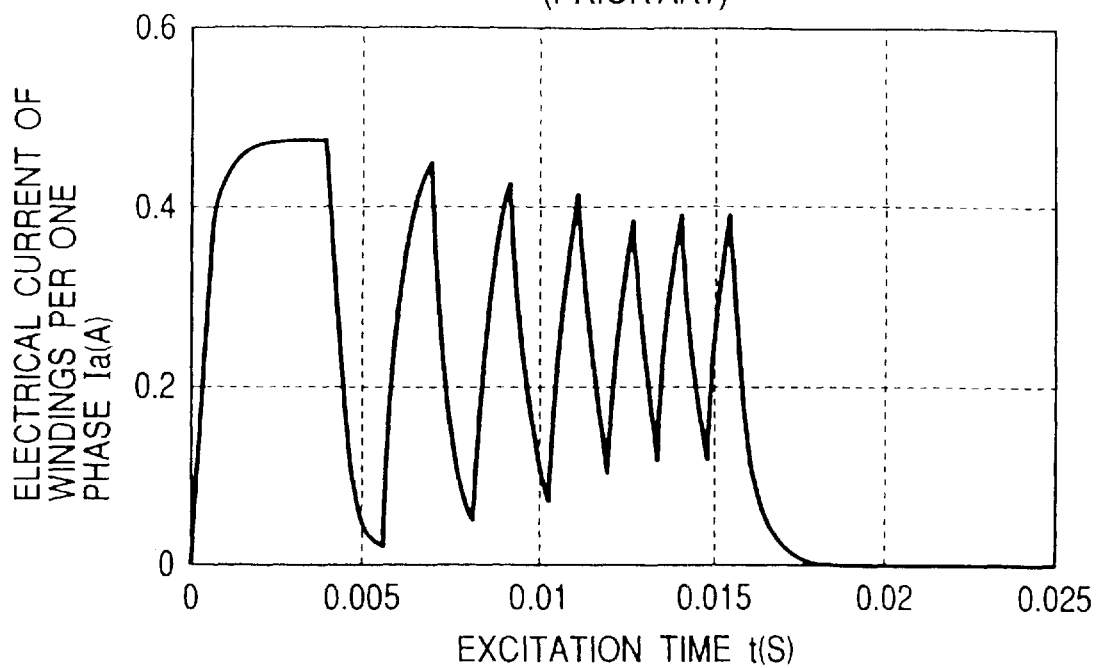
FIG. 10 shows an electrical current of windings per one phase during the acceleration in the stepping motor drive control according to the prior art.
Figure 11:
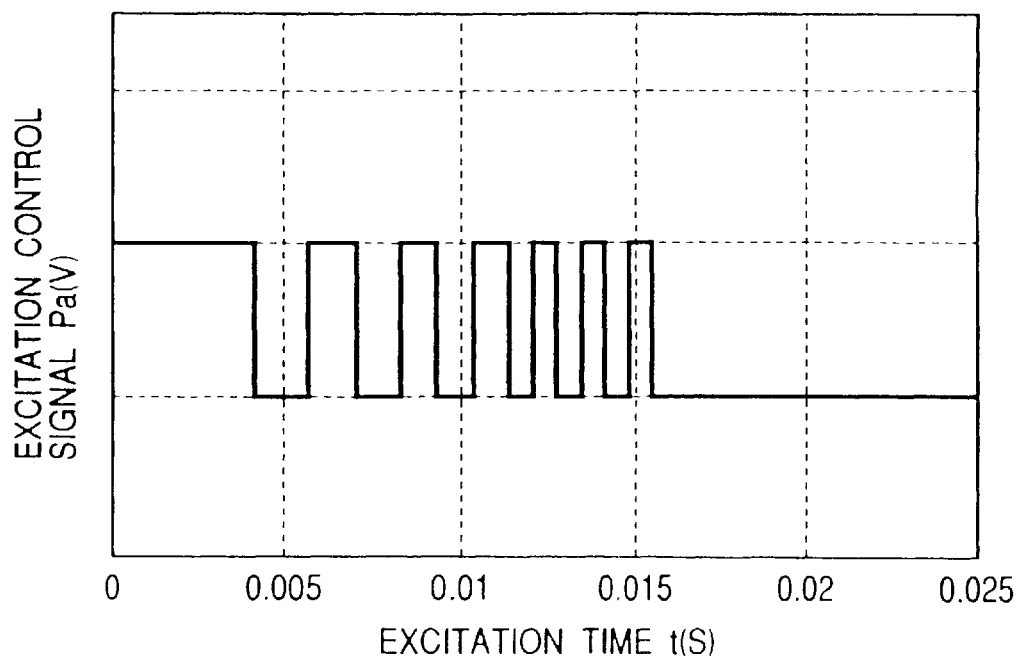
FIG. 11 shows an excitation control signal during the acceleration in the stepping motor drive control according to the prior art.

Next, an attempt is made to find the electrical current of windings flowing in the stepping motor 110 based on the aforedescribed control with respect to the acceleration control and deceleration control of FIGS. 2, 6 and 10. When the winding resistance per one phase of the stepping motor 110 shown in FIG. 2 is defined as R (ohm) and the inductance of the windings is defined as L (H) and the applied voltage 109 to the stepping motor is defined as E (V) and the time of the excitation control signal is defined as t (sec), the electrical current flowing through the windings can be derived by the following expression. When the excitation control signal changes from 0 V to 5 V (hereinafter referred to as ON), the corresponding transistor of the transistor array 112 becomes connected, and an electrical current begins to flow through the windings, and the electrical current Ir(t) at this time becomes $$IR(t)=E/r(1-e^{-R/L*t}).$$

When conversely, the excitation control signal changes from 5 V to 0 V (hereinafter referred to as OFF) at a time P, the corresponding transistor of the transistor array 112 becomes cut off, and the electrical current no longer flows through the windings, and the electrical current Id(t) at this time becomes $$Id(t)=Ir(t)*e^{-R/L(t-P)}.$$

Both of Ir(t) and Id(t) are functions of time (t), and show that if the excitation time becomes loner, a great electrical current flows through the windings at the rising, and a small electrical current flows through the windings at the falling.

Thus, if the winding resistance per one phase of the stepping motor 110 in the present embodiment is 50 (ohm) and the inductance of the windings is 25 mH and the applied voltage 109 to the stepping motor is 24 (V), when the time t (sec) of the excitation control signal is such that as shown in FIGS. 6 and 8, the initial phase excitation retaining time during acceleration control and the final phase excitation retaining time during deceleration control are 4.0 ms and during the excitation phase retaining period of time 4.0 ms, the excitation phase is chopped by a quadruple frequency, and the electrical current of windings in the embodiment becomes a wavy electrical current as shown in FIGS. 5 and 7.

Figure 12:
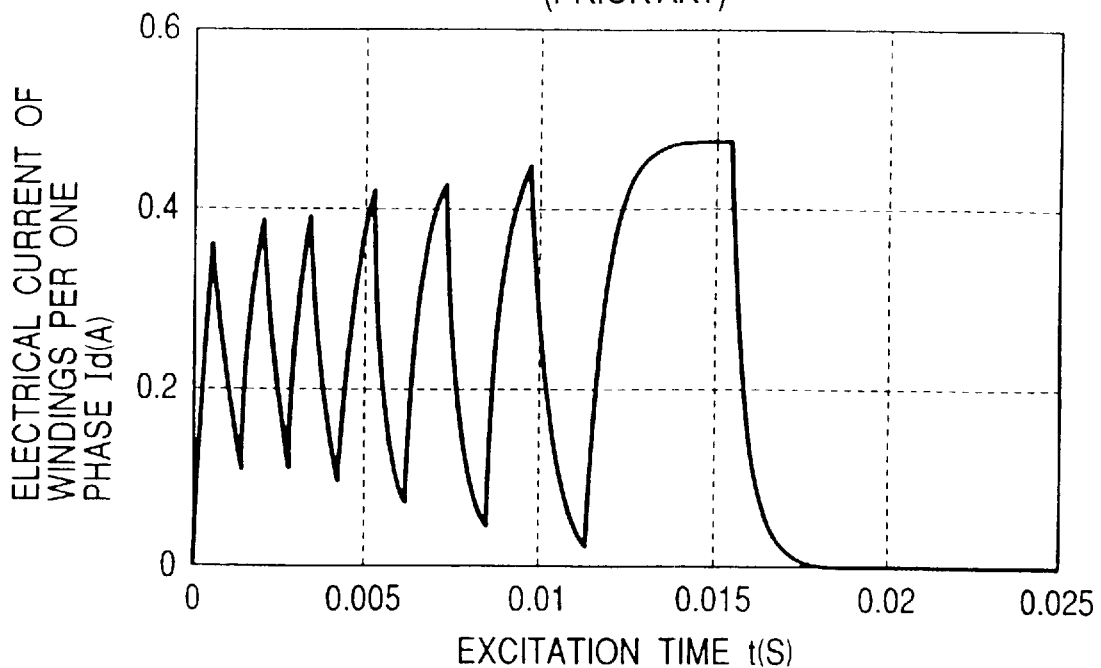
FIG. 12 shows an electrical current of windings per one phase during the deceleration in the stepping motor drive control according to the prior art.
Figure 13:
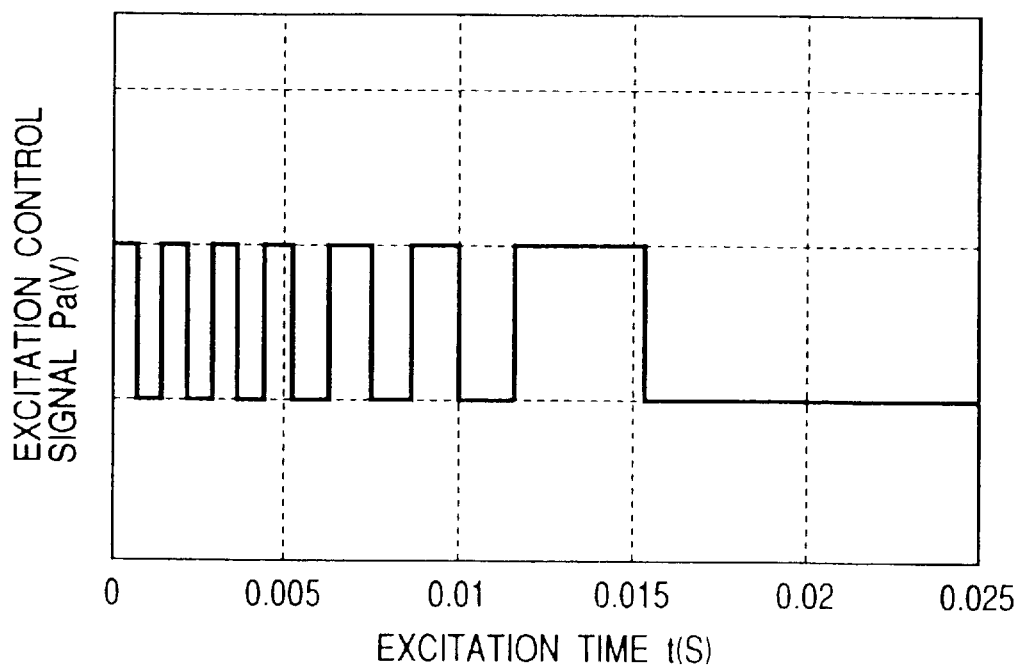
FIG. 13 shows an excitation control signal during the deceleration in the stepping motor drive control according to the prior art.
Figure 14:
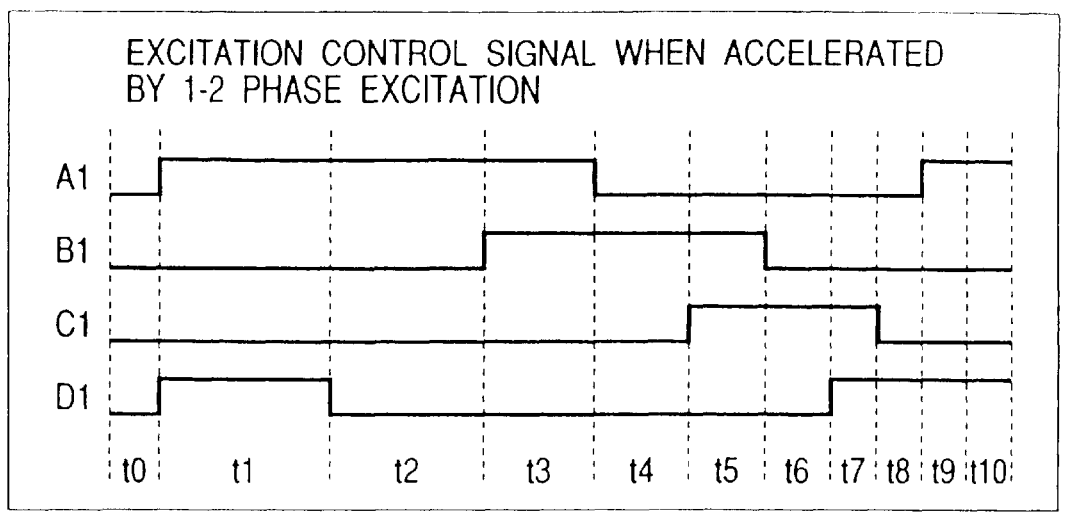
FIG. 14 shows an excitation control signal during the 1–2 phase excitation acceleration in the stepping motor drive control according to the prior art.
Figure 15:
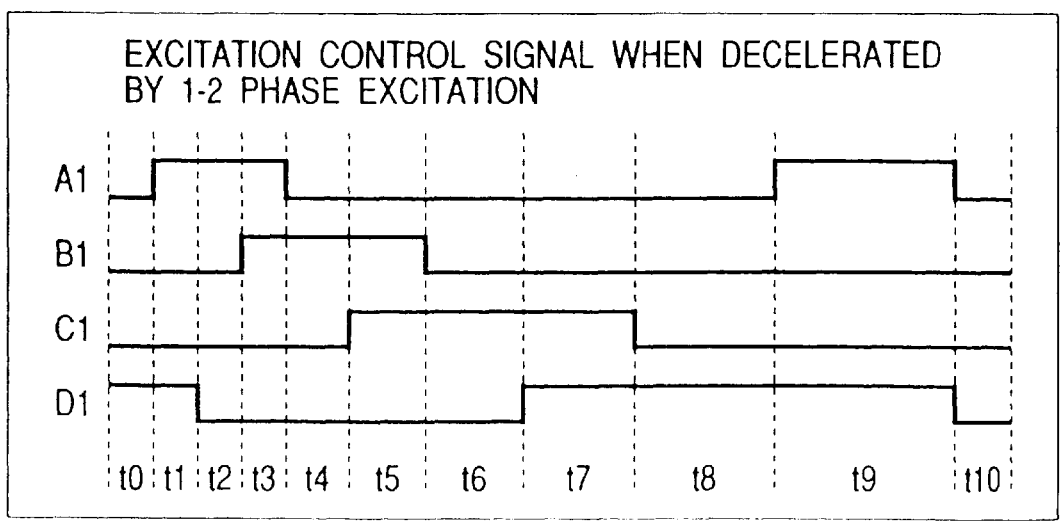
FIG. 15 shows an excitation control signal during the 1–2 phase excitation deceleration in the stepping motor drive control according to the prior art.
Figure 16:
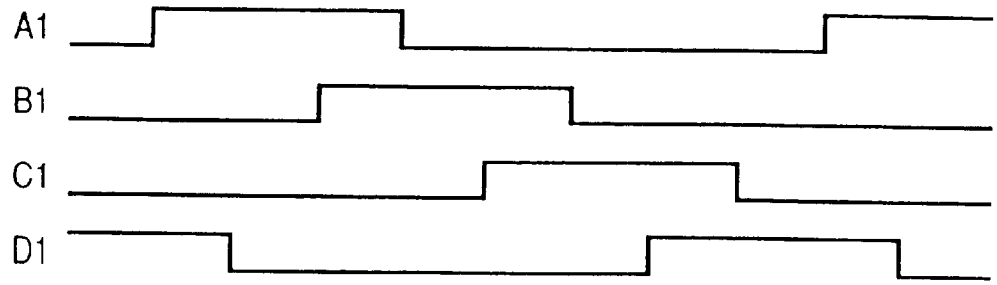
FIG. 16 shows an excitation control signal for 1–2 phase excitation in the stepping motor drive control according to the prior art.
Figure 17:
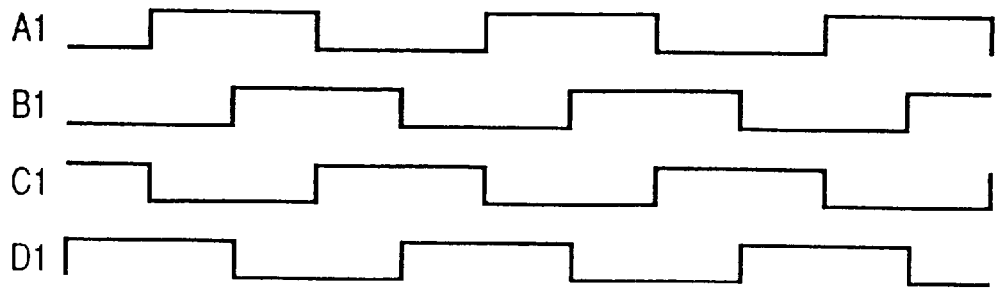
FIG. 17 shows an excitation control signal for second phase excitation in the stepping motor drive control according to the prior art.
Figure 18:
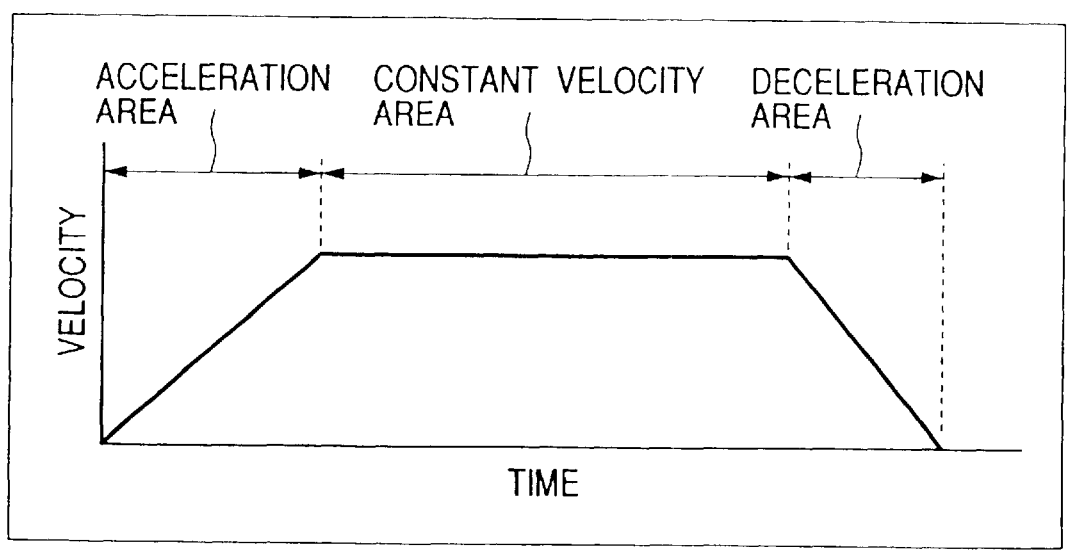
FIG. 18 shows the velocity control of a motor.

Comparing this with the waveform of the electrical current when under similar conditions, the initial phase excitation retaining time and the final phase excitation retaining time are a 4.0 ms period excitation retaining time as in the example of the prior art shown in FIGS. 10 and 12, in the case of the present embodiment, the peak of the electrical current during the initial phase retaining period of the acceleration control and the final excitation phase retaining period of the deceleration control is smaller by about 20% than in the example of the prior art. Also, from the fact that the waveform of the electrical current becomes wavy, it is seen that electrical energy applied to the stepping motor 110 is also small.

The aforedescribed electrical current is the electrical current of windings per one phase of the stepping motor, and as a method of driving the stepping motor, there is the aforedescribed 1–2 phase excitation system or the second phase excitation system, and there is a period during which two phases are excited at a time, and as a matter of course, the driving current at this time becomes double, but even if the electrical current of windings per one phase is that during an excitation retaining period of a predetermined time, the electrical current is restrained by being chopped by a predetermined cycle and therefore, any excessively great electrical current does not flow.

Also, a paper conveying drive or a paper feeding drive in a printer or the like is conceivable as an example of actual application, but generally one or more stepping motors are mounted and therefore, it is necessary to drive two or more stepping motors at a time, and in the present embodiment, the stepping motors 110 and 113 are a paper feeding motor and a paper conveying motor, respectively, and by the instructions of the MPU 101, the paper feeding motor is driven when the paper feeding operation is performed, and the paper conveying motor is driven when the conveyance of paper is performed.

It is apparent that the present embodiment is effective even when the paper feeding operation and the paper conveying operation are individually or exclusively controlled, but when the paper feeding operation and the paper conveying operation are performed in synchronism with each other, greater curtailment of the electrical current becomes possible, and of course, this is more effective than when a single stepping motor is driven. Accordingly, even if two or more stepping motors are driven at a time in synchronism with each other, the excessively great electrical current flowing for retaining the initial excitation of the acceleration control and retaining the final excitation phase of the deceleration control can be restrained and therefore, a great power source capacity is not required and it never happens that the power source is cut off by an overcurrent.

[Embodiment 2]

Figure 9:
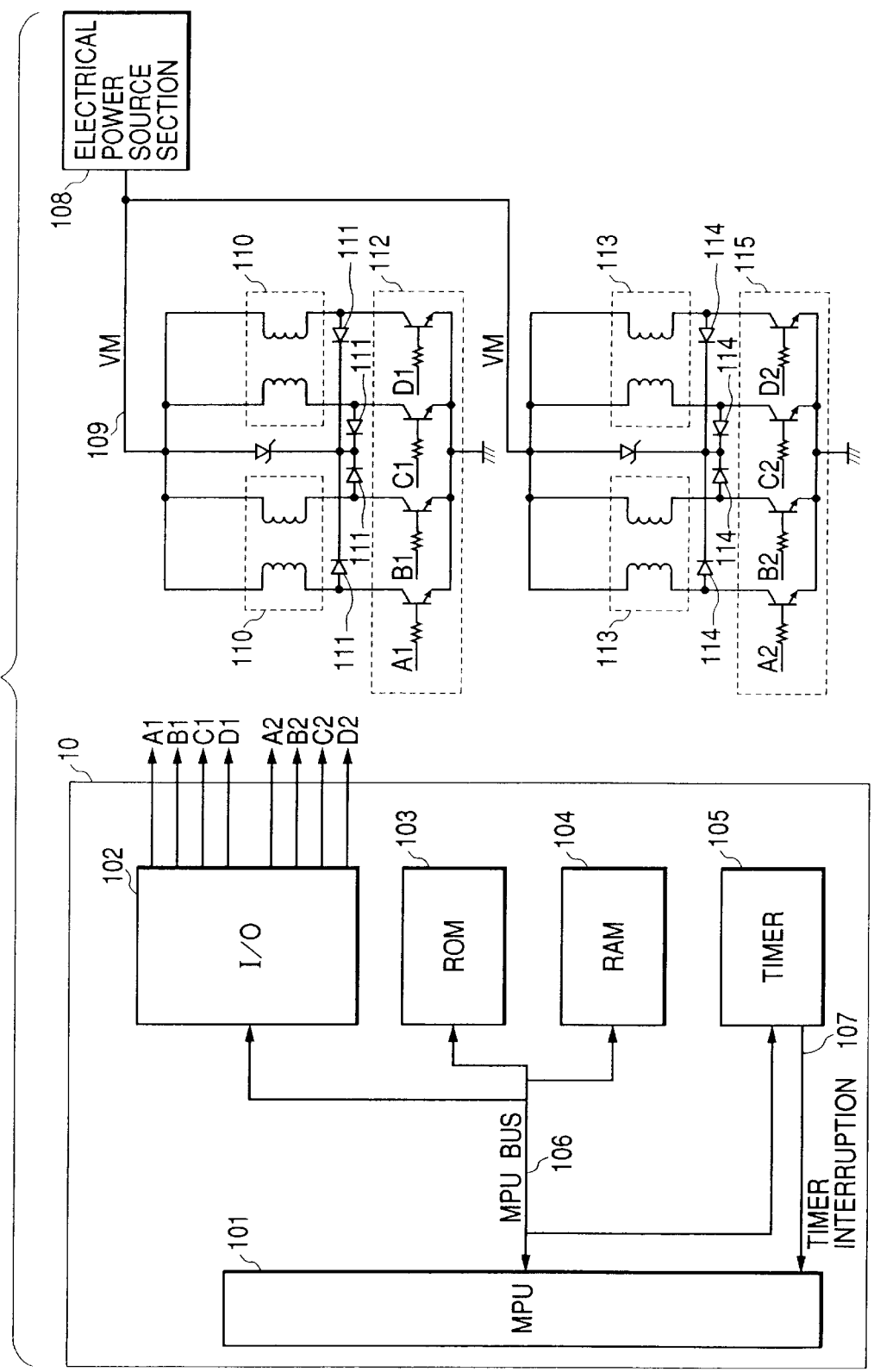
FIG. 9 is a block diagram of a stepping motor drive control circuit according to Embodiment 2 of the present invention.

While the foregoing description has been made with respect to an MPU having no peripheral functions, control can be effected by a so-called one-chip microcontroller (hereinafter referred to as the MCU) containing therein the functions of an output port, a timer, a ROM, a RAM, etc. As a result, the number of parts can be decreased. FIG. 9 shows the construction block when such an MCU is used for the control of the rotation of a stepping motor.

In FIG. 9, the MCU 10 contains therein at least an MPU 101, an output port 102 and a timer 105, and in the present embodiment, it further contains therein a ROM 103 and a RAM 104. The control output and control system in this case are similar to those described in the previous Embodiment 1 and therefore need not be described in detail.

While in the description hitherto, the chopping control of the excitation phase has been described with reference to the retaining of the initial phase excitation of the acceleration control and the retaining of the final phase excitation of the deceleration control, the present invention is not restricted to the chopping control between one step of the retaining of the initial phase excitation of the acceleration control and one step of the retaining of the final phase excitation of the deceleration control, but it is also possible to prepare in the ROM 103 an excitation control signal table for chopping predetermined driving steps, and control it, and of course, this is also applicable to the retaining control in which the motor current is allowed to flow, or is applicable to low speed rotation control, high speed rotation controls acceleration control and deceleration control. A similar effect can also be applied during the driving of a bipolar motor.

As described above, according to the present invention, the consumption of electric power by the stepping motors can be curtailed and a power source circuit having a great power capacity is not required for the driving of the stepping motors, and a protection circuit for the power source is operated for an excessively great electrical current and it never happens that the power source is cut off, nor does it happen that the power source circuit becomes unstable. Particularly, even if two or more stepping motors are driven at a time in synchronism with each other, an excessively great electrical current of windings flowing for retaining the initial excitation of the acceleration control and for retaining the final excitation phase of the deceleration control can be restrained and therefore, a great power source capacity is not required and it never happens that the power source is cut off by an overcurrent. Also, the present invention can be carried out by only the control of firmware and does not particularly require an external additional circuit and therefore can be realized inexpensively.

What is claimed is:

1. A drive control system for a stepping motor comprising:
   a stepping motor;
   a read-only memory for storing a table for controlling said stepping motor;
   a timer for counting a timing switching a phase excitation signal of said stepping motor;
   a microprocessor unit for controlling said stepping motor by the table stored in said read-only memory; and
   discriminating means for discrminating whether or not it is in an acceleration initial excitation period, said stepping motor being chopped by a chopping duration stored in said read-only memory if discriminated that it is in the acceleration initial excitation period.

2. A drive control system according to claim 1, wherein the acceleration initial excitation period is one step.

3. A drive control system according to claim 1, wherein the acceleration initial excitation period is a plurality of steps.

4. A drive control system for a stepping motor comprising:
   a stepping motor;
   a read-only memory for storing a table for controlling said stepping motor;
   a timer for counting a timing switching a phase excitation signal of said stepping motor;
   a microprocessor unit for controlling said stepping motor by the table stored in said read-only memory; and
   discriminating means for discriminating whether of not it is in a deceleration initial excitation period, said stepping motor being chopped by a chopping duration stored in said read-only memory if discriminated that it is in the deceleration initial excitation period.

5. A drive control system according to claim 4, wherein the deceleration initial excitation period is one step.

6. A drive control system according to claim 4, wherein the deceleration initial excitation period is a plurality of steps.

7. A drive control system for a stepping motor comprising:
   a stepping motor;
   a read-only memory for storing a table for controlling said stepping motor;
   a timer for counting a timing switching a phase excitation signal of said stepping motor;
   a microprocessor for controlling said stepping motor by the table stored in said read-only memory;
   discriminating means for discriminating whether or not it is in an acceleration initial excitation period, said stepping motor being chopped by a chopping duration stored in said read-only memory if discriminated that it is in the acceleration initial excitation period; and
   discrminating means for discriminating whether or not it is in a deceleration initial excitation period, said stepping motor being chopped by a chopping duration stored in said read-only memory if discriminated that it is in the deceleration initial excitation period.

8. A drive control system for a stepping motor comprising:
   a stepping motor;
   an electrical power source for supplying an electrical power to said stepping motor;
   a read-only memory for storing a table for controlling said stepping motor;
   a timer for counting a timing switching a phase excitation signal of said stepping motor;
   a microprocessor unit for controlling said stepping motor by the table stored in said read-only memory; and
   discrminating means for discriminating whether or not it is in an acceleration initial excitation period, said stepping motor being chopped by a chopping duration stored in said read-only memory if discriminated that it is in the acceleration initial excitation period.

9. A drive control system according to claim 8, wherein the acceleration initial excitation period is one step.

10. A drive control system according to claim 8, wherein the acceleration initial excitation period is a plurality of steps.

11. A drive control system for a stepping motor comprising;
    a stepping motor;
    an electrical power source for supplying an electrical power to said stepping motor;
    a read-only memory for storing a table for controlling said stepping motor;
    a timer for counting a timing switching a phase excitation signal of said stepping motor;
    a microprocessor unit for controlling said stepping motor by the table stored in said read-only memory; and
    discriminating means for discriminating whether or not it is in a deceleration initial excitation period, said stepping motor being chopped by a chopping duration stored in said read-only memory if discriminated that it is in the deceleration initial excitation period.

12. A drive control system according to claim 11, wherein the deceleration initial excitation period is one step.

13. A drive control system according to claim 11, wherein the deceleration initial excitation period is a plurality of steps.

14. A drive control system for a stepping motor comprising:
    a stepping motor;
    an electrical power source for supplying an electrical power to said stepping motor;
    a read-only memory for storing a table for controlling said stepping motor;
    a timer for counting a timing switching a phase excitation signal of said stepping motor;
    a microprocessor unit for controlling said stepping motor by the table stored in said read-only memory;
    discriminating means for discriminating whether or not it is in an acceleration initial excitation period, said stepping motor being chopped by a chopping duration stored in said read-only memory if discriminated that it is in the acceleration initial excitation period; and
    discriminating means for discrminating whether or not it is in a deceleration initial excitation period, said stepping motor being chopped by a chopping duration stored in said read-only memory if discriminated that it is in the deceleration initial excitation period.

* * * * *

UNITED STATES PATENT AND TRADEMARK OFFICE
CERTIFICATE OF CORRECTION

PATENT NO. : 6,462,503 B1
DATED : October 8, 2002
INVENTOR(S) : Sadatoshi Narazaki It is certified that error appears in the above-identified patent and that said Letters Patent is hereby corrected as shown below:

Column 2,
Line 19, "excited" should read -- excitation --.

Column 5,
Line 29, "acceleration rotatively" should read -- acceleration-rotatively --.

Column 6,
Line 22, "diving" should read -- driving --.

Column 8,
Line 49, "stop" should read -- step --.
Line 54, "form" should read -- from --.
Line 55, "so" should read -- to --.
Line 62, "step S13." should read -- step S13. ¶ At the step S13, whether the deceleration control has been terminated is discriminated, and if it has been terminated, the deceleration control flag is reset at the step S14 to thereby terminate the deceleration control. If the period is a period for the deceleration control, the interruption processing is terminated, and the next interruption is waited for. --.

Column 9,
Line 25, "IR(t)=E/r" should read -- Ir(t)=E/R --.
Line 36, "loner," should read -- longer, --.

Column 11,
Line 40, "of" should read -- or --.

UNITED STATES PATENT AND TRADEMARK OFFICE
CERTIFICATE OF CORRECTION

PATENT NO. : 6,462,503 B1
DATED : October 8, 2002
INVENTOR(S) : Sadatoshi Narazaki It is certified that error appears in the above-identified patent and that said Letters Patent is hereby corrected as shown below:

Column 12,
Line 24, "ing;" should read -- ing: --.

Signed and Sealed this

Twentieth Day of May, 2003

JAMES E. ROGAN
*Director of the United States Patent and Trademark Office*